United States Patent
Tate Morgan

(10) Patent No.: US 11,865,956 B2
(45) Date of Patent: Jan. 9, 2024

(54) ENERGY ATTENUATING SEAT ASSEMBLY

(71) Applicant: Tate Technology, LLC, Pacific Palisades, CA (US)

(72) Inventor: Jenny Tate Morgan, Pacific Palisades, CA (US)

(73) Assignee: TATE TECHNOLOGY, LLC, Pacific Palisades, CA (US)

( * ) Notice: Subject to any disclaimer, the term of this patent is extended or adjusted under 35 U.S.C. 154(b) by 0 days.

(21) Appl. No.: 17/584,828

(22) Filed: Jan. 26, 2022

(65) Prior Publication Data

US 2022/0234483 A1 Jul. 28, 2022

Related U.S. Application Data

(60) Provisional application No. 63/142,657, filed on Jan. 28, 2021.

(51) Int. Cl.
*A47C 7/02* (2006.01)
*B60N 2/58* (2006.01)
*B60N 2/70* (2006.01)
*B60N 2/42* (2006.01)

(52) U.S. Cl.
CPC . *B60N 2/70* (2013.01); *B60N 2/42* (2013.01)

(58) Field of Classification Search
CPC ........ B32B 5/26; B32B 2262/106; B32B 3/12
See application file for complete search history.

(56) References Cited

U.S. PATENT DOCUMENTS

| | | | | |
|---|---|---|---|---|
| 5,247,749 A | * | 9/1993 | Bury | B23Q 1/015 428/116 |
| 5,415,715 A | * | 5/1995 | Delage | B32B 18/00 428/116 |
| 5,421,935 A | * | 6/1995 | Dixon | B29C 66/919 428/116 |
| 5,514,445 A | * | 5/1996 | Delage | B29D 99/0089 428/116 |
| 5,789,059 A | * | 8/1998 | Nomoto | B29D 99/0089 428/116 |
| 5,876,831 A | * | 3/1999 | Rawal | B32B 7/12 428/117 |
| 5,894,044 A | * | 4/1999 | Norcom | B31D 3/0246 428/116 |
| 6,117,518 A | * | 9/2000 | Cawse | B32B 5/26 428/116 |
| 8,235,461 B2 | * | 8/2012 | Cohen | A42B 3/124 297/180.13 |
| 8,795,806 B2 | * | 8/2014 | Pflug | B29C 53/063 428/116 |
| 9,211,827 B2 | * | 12/2015 | Michalak | B60N 2/56 |
| 9,259,889 B2 | * | 2/2016 | Streuber | B32B 15/046 |
| 9,631,519 B2 | * | 4/2017 | Fouquet | C04B 35/573 |
| 10,150,392 B2 | * | 12/2018 | Mani | B60N 3/066 |
| 10,167,583 B2 | * | 1/2019 | Witte | B32B 5/26 |
| 10,220,736 B2 | * | 3/2019 | Cormier | B60N 2/24 |

(Continued)

*Primary Examiner* — Shin H Kim
(74) *Attorney, Agent, or Firm* — Jeffer Mangels; Butler & Mitchell LLP; Brennan C. Swain, Esq.

(57) ABSTRACT

A seat assembly that includes a main body portion having a seat portion and a back portion extending upwardly from the seat portion. The main body portion includes an inner layer and an outer layer. A middle layer is positioned between the inner and outer layers. The middle layer includes a plurality of rings that are not co-axial with one another.

14 Claims, 6 Drawing Sheets

(56) References Cited

U.S. PATENT DOCUMENTS

| | | | | |
|---|---|---|---|---|
| 10,231,549 B2* | 3/2019 | Johnson | ............... | A47C 7/546 |
| 10,612,186 B2* | 4/2020 | Fouquet | ............ | C04B 35/62218 |
| 11,284,666 B2* | 3/2022 | Morgan | ................ | A43B 3/163 |
| 11,311,068 B2* | 4/2022 | Hilliard, Sr. | ............ | A42B 3/063 |
| 11,433,633 B2* | 9/2022 | Calisch | ............. | B29D 99/0089 |
| 2009/0283635 A1* | 11/2009 | Gerken | ............. | B29D 99/0089 |
| | | | | 428/116 |
| 2011/0175416 A1* | 7/2011 | Cohen | .................... | B60N 2/70 |
| | | | | 297/354.12 |
| 2011/0281063 A1* | 11/2011 | Levit | ...................... | B32B 27/04 |
| | | | | 428/116 |
| 2012/0313409 A1* | 12/2012 | Michalak | ................ | B60N 2/56 |
| | | | | 297/452.41 |
| 2014/0007761 A1* | 1/2014 | Haidar | .................... | B60N 2/24 |
| | | | | 89/36.01 |
| 2015/0247298 A1* | 9/2015 | Li | .......................... | B64F 1/025 |
| | | | | 428/116 |
| 2016/0377139 A1* | 12/2016 | Vito | ....................... | B32B 5/024 |
| | | | | 267/141 |
| 2018/0057060 A1* | 3/2018 | Tyan | ...................... | B32B 27/34 |
| 2018/0099475 A1* | 4/2018 | Tyan | ...................... | B32B 21/06 |
| 2019/0351650 A1* | 11/2019 | Sohn | ...................... | B32B 21/04 |
| 2020/0221804 A1* | 7/2020 | Morgan | ................... | A42B 1/08 |
| 2020/0221816 A1* | 7/2020 | Morgan | ................... | A43B 1/14 |
| 2020/0262992 A1* | 8/2020 | Ahn | ......................... | B32B 5/12 |
| 2021/0190166 A1* | 6/2021 | Wu | ........................ | C08K 3/042 |
| 2021/0252356 A1* | 8/2021 | Thurman | ............... | A63B 59/42 |

* cited by examiner

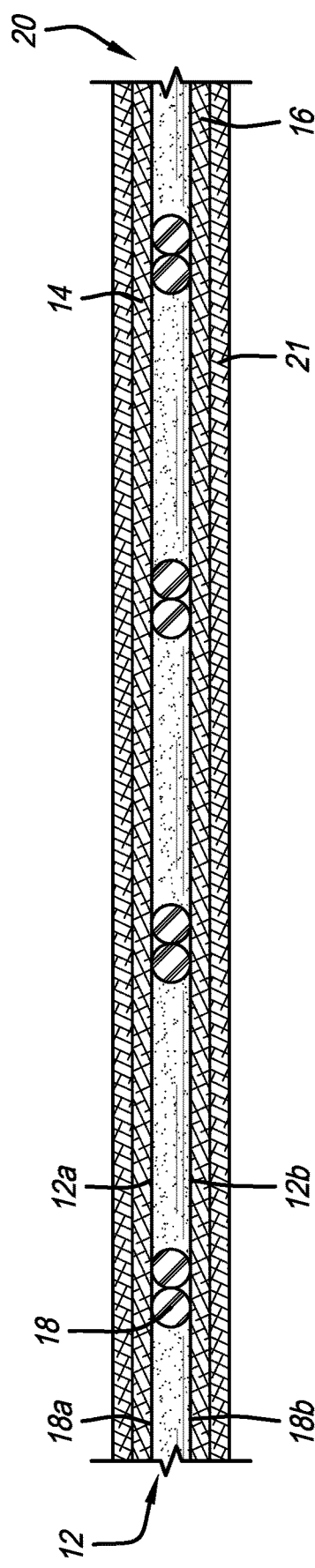
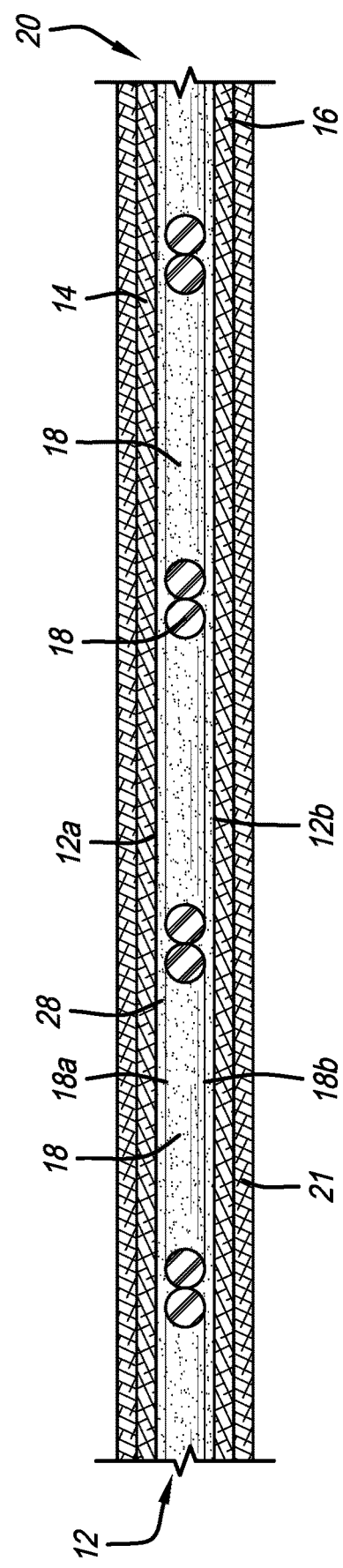

ENERGY ATTENUATING SEAT ASSEMBLY

CROSS REFERENCE TO RELATED APPLICATIONS

This application claims the benefit of U.S. Provisional Application No. 63/142,657, filed Jan. 28, 2021, the entirety of which is incorporated herein by reference.

FIELD OF THE INVENTION

The invention generally relates to general automotive seat(s) seat(ing), aftermarket auto seat(s), seat(ing), as well as racing automotive seat(s) seat(ing), such as used in amateur, semi-professional, and professional activities and sports including, but not limited to all makes of new autos to be sold into the global general market, existing automobiles seeking seating replacement or upgrades, racing cars such as NASCAR, Grand Prix, and Indy as sports examples seeking safer seating for their drivers. The invention is for replacement, or aftermarket automotive seat(s), seats for newly manufactured autos, as well as seat(s) for all types of automotive racing in all forms.

BACKGROUND OF THE INVENTION

Various activities, such as general automotive use, and automotive racing, demanding seat construction and manufacturing using new or existing materials that are lighter than steel, such as carbon fiber, are stated to provide an improved material to protect the driver. Most seats presently manufactured for the automotive aftermarket and NASCAR auto racing use a mold, and two to sixteen layers of carbon fiber, and sometimes with some fiberglass, nylon reinforcement layer(s), and Kevlar as the seat base, back and head rest whether all in one mold or separate molds. Most racing and aftermarket seats are designed for the wearer for shape and use of material science besides steel. The list of attributes of the present invention includes reduced weight, reduced layers of carbon fiber including other materials, as well as reducing the amount of resin, plus impact mitigation/energy attenuation, which are all important in racing, as well in the general automotive markets, plus the new invention will be able to offer heating and ventilation currently provided in numerous standard seating in most and luxury car seats, and the racing seats add adoptability for including the HANS system. In racing what is important is weight reduction for speed of the auto, fit to the wearer, and that following a crash, the driver can be extricated from the car following by lifting out the entire seat, which minimizes the risk of spinal damage. Carbon fiber is touted as better shock absorption than steel with foam thus the change from use of steel to carbon fiber in 2000/2001 in NASCAR. The shape assists amateur and professional racing drivers at high speeds and in cornering providing racers with the ability to tackle a track at triple digit speeds. The seat, curves around the driver's shoulders, hips, and abdomen, so the driver's body doesn't slip when handling 5G (g-force) of lateral forces. To keep the car's center of gravity as low as possible, the bottom of the seat is on the floor of the chassis, just inches above the ground. Without much in the way of a suspension, the driver can feel every p in the road. New autos sometimes have the seats attached to the auto's steel frame, but most often to a track system that connects the steel auto frame. The new auto seat is comprised of springs, steel and foam.

Seats coupled with seat belt systems attempt to safeguard participants from impact injuries to their bodies, heads and necks etc. that may be sustained during such activities. Various types of seats have been in use since the invention of the auto, ever since individuals began sitting behind a motorized vehicle. Many changes have ensued over time to provide both comfort and as much safety available. Carbon fiber and other composites are being used in numerous applications, including the automotive market for other car parts besides seats from hoods, mirrors, seats, and much more.

Typically, these seats historically included a steel frame, springs for the base, and in the back, foam, some type of natural or synthetic cover, as well as heating, cooling, ventilation, head rests with air bags, and more.

Aftermarket seats(s) frames/molds include new material science in lieu of steel using single material science use, composites, blends, and more, from carbon fiber, to fiberglass, Kevlar and more composites using additional blended materials to include, but not be limited to polycarbonate, ABS and more.

Typically, these new, aftermarket, and racing seat(s) have included: a molded seat(s), generally made of an appropriate newer material science including but not limited to carbon fiber, fiberglass, composites, nylon, polycarbonate, steel, aluminum, ABS, polypropylene, other metals, thermoplastics, and more.

These newer material science "materials," having the requisite strength and durability characteristics to enable them to be used in general automotive use and in automotive racing with caveats that carbon fiber breaks, as well as fiberglass breaks with sufficient direct impact force, not unlike in other use such as helmetry, and indirect impact force, where the seat should be replaced after an impact versus a metal frame construction does not necessarily need to be replaced after an accident.

In order to prevent injuries from occurring while driving and racing, it should be noted that as to the seat(s) of the present invention, as well as prior art seat(s), due to the nature of the automotive driving and automotive racing in general, no equipment, or protective equipment in the auto can completely, totally prevent short term or long term injuries to those individuals driving. It should be further noted that no equipment can completely prevent injuries to a driver, and no seat(s) equipment, such as that of the current invention, can completely prevent injuries to the driver while participating in general automotive or racing. The seat as stated herein of the present invention is believed to offer improved driver energy attenuation, impact mitigation characteristics and strengthening of material science to enhance protection of the driver from both direct and indirect impact force. It is believed that no seat, can, or will ever, totally and completely prevent injuries to the driver.

The seat system of the current invention, when compared to prior art proposed conventional and new material science seats has the advantages of: being designed to energy attenuate impact force, as well as strengthen material science while using minimal material science layers to reduce weight in the seat manufacture.

Furthermore, as an example, a prior art manufacturing process requiring time consuming and costly processes and steps, such as having to cycle particularly between cooling and heating cycles when manufacturing with carbon fiber and/or Kevlar. Employing the "reinforcement" as an apparatus reduces or may eliminate a step of this cycling in most cases.

Furthermore, in accordance with the current invention the foregoing advantages have been achieved through the present energy attenuation "adjacent," "side-by-side," "in contact with one another" "connected" coils/rings/hoops, or may be overlapping in an energy attenuating continuous unwelded coil "mat system," or inter-connected, or connected mat system embedded into the new material science layers to be located in the center/middle of these layers, or molded into the polycarbonate, ABS, etc. The energy attenuating continuous unwelded coil mat system strengthens the material science, as well as energy attenuates the direct or indirect impact g-force, including linear impact force and rotational acceleration and velocity thus reducing impact force by converting the energy to heat.

Furthermore, in accordance with the present invention the seat will also have the ability to have heating, cooling and ventilation systems, foam and memory foam, other soft to more rigid foams, natural materials such as bamboo, and more, plus may have non-Newtonian fluids displacement materials and construction, other optional filler material may be comprised of polypropylene, Kevlar®, or other materials conventional and non-conventional used in prior art, also to be covered with an outer layer/covering in leather, synthetics, materials, fibers, possible new environmental material science solutions, wicking/breathable materials, gripping/non-sticking materials, and more. With respect to non-Newtonian fluids see U.S. Patent Publication Nos. 2020/0221804 and 2020/0221807, the entireties of which are incorporated by reference herein.

Furthermore, in accordance with the present invention the seat may also be covered in carbon fiber strands unwoven and immersed into an emolument solution, or some solution to create sheets of loose continuous fibers or strands making soft pliable sheets of carbon fiber without the rigidity of the carbon fiber when woven. Less resin is required between layers using this system. Similar construct in loose strands may be created in fiberglass and nylon, both of which are typically weaves in the prior art.

The formed seat comprising: at least one continuous wall having a peripheral surface adapted to substantially conform to the driver, and at least one wall having an outer surface and an inner surface, the outer surface adapted to be disposed adjacent the interior surface of the seat and the inner surface whereby between the outer layer and the inner layer contains the impact force attenuated energy attenuating continuous unwelded coil mat system conforming to the seat shape. The coils may also be referred to herein as rings, hoops or other similar shape.

A further feature of the seat system is that between the inner and outer surfaces of the at least one wall, and preferably two walls may include at least one multi-layered impact force attenuated impact absorption energy attenuating continuous unwelded coil mat system. The energy attenuating continuous unwelded coil mat system having variable qualities and characteristics as needed thus energy attenuating i.e. controlling and directing a wider range of multi-dimensional impact shock waves in conjunction with the reinforced seat(s) of the present invention having a significant advantage over the prior art.

Having improved multi-dimensional synergistic impact force energy attenuation characteristics more specifically impact(s) surface accelerations and waveguide stress transferring characteristics having synergistic combinations of seat impact stress transfer in just material science alone, i.e. carbon fiber does not translate/convert impact energy/force to heat. The material science absorbs almost no energy; it is highly "elastic," (all kinetic energy is preserved). An elastic collision (steel balls) results in more acceleration damage versus an "inelastic" collision (all kinetic energy is dissipated into heat). The energy attenuating continuous unwelded coil mat system redirects the energy perpendicular to the incident blow whether direct or indirect and the energy translates through the energy attenuating continuous unwelded coil mat system thereby splashing against itself and cancelling the energy, i.e., converting it into heat reducing impact force metrics by energy attenuating the impact force.

As the current invention is as separate and distinct from the prior art having previously unavailable reinforcement geometries that provides a wider range of impact attenuation and displacement as needed within the art. An object of the present invention is to meet or exceed existing "prior art" seat(s) performances and to reduce weight, reduce mass, improve and reduce impact force, reduce effects of acceleration and deceleration speeds, address compression and tension forces, and improve energy attenuation capabilities and ranges.

Additionally, having previously unavailable impact shock reduction method beyond material science alone, and attenuation displacement characteristics in seat(s), a further feature of the seat system is that when the energy attenuating continuous unwelded coil/ring/hoop mat system is embedded within the entire seat system inner layers the ring mat system improves or reduces the cracking of "resin" used with carbon fiber, fiberglass, etc. in production. Resin is the "glue," but is also the weakness of this material science and fabrication process, as it cracks on impact.

In accordance with the current invention the foregoing advantages have also been achieved through the present protective reinforced seat system comprising: a seat having an interior and exterior surface, portions of the interior and exterior surface having force attenuating continuous coil mat system structures disposed thereon within a spaced yet closed relationship; with the seat to substantially conform or may not be as confirming to the driver, and the force attenuating system mat system structures of the seat for engagement with the driver; the at least force attenuating energy attenuating continuous unwelded coil mat system preferably having a generally coil/ring/hoop, or continuous or non-continuous circular shape with an outer surface and an inner surface; the surfaces of which are adapted to be disposed adjacent the interior and exterior surface of the seat. See also the coils disclosed in U.S. Pat. No. 9,314,060, the entirety of which is incorporated by reference herein.

A further feature of the seat system is that at least one wall may include at least one seat attachment aperture adapted to connect the HANS system seat(s) in racing. Another feature of the seat system is that the plurality of edge surfaces of the first side wall may include first, second, third, and fourth, fifth edge surfaces, the first and third edge surfaces being disposed substantially perpendicular to the first longitudinal axis, and the second and fourth edge surfaces being disposed substantially parallel to the first longitudinal axis.

In accordance with the current invention the foregoing advantages have also been achieved through the present protective reinforced seat system comprising: a seat having an interior and exterior surface, portions of the interior and exterior surface having force attenuating continuous coil structures disposed thereon within a spaced yet closed relationship; with the seat to substantially conform to the driver, and the force attenuating system structures of the seat for engagement with the driver; the at least force attenuating energy attenuating continuous unwelded coil mat system preferably having a generally coil, or continuous or non-continuous circular shape with an outer surface and an inner surface; the surfaces of which are adapted to be disposed adjacent the interior and exterior surface of the seat. See also the coils disclosed in U.S. Pat. No. 9,314,060, the entirety of which is incorporated by reference herein.

The seat system with the energy attenuating continuous unwelded coil mat system(s) of the present invention, when compared with prior art seats, have the advantages of: provides additional multi-dimensional impact force energy attenuation characteristics versus a wide variety of prior art seats.

A reinforced and impact attenuating seat(s) that includes a continuous unwelded coil mat system(s)/overlapping or side-by-side, or adjacent, or in contact with one another coils attenuation apparatus system seat(s) configured to receive the body of the automobile or racing vehicle driver in the seat(s), the seat(s) comprising an outer surface and an inner surface, a series of continuous unwelded coil mat system(s)/overlapping coils, filler material, which may or may not be the resin used in carbon fiber, or other materials production, and/or a prospective layer of honeycomb enclosed inside the closed honeycomb cells is non-Newtonian fluid. The series of continuous unwelded coil mat system(s)/overlapping or adjacent coils are entirely encased within the filler material or resin or other materials to form a reinforcement layer, the reinforcement layer having a first surface and an opposing surface, the first surface of the reinforcement layer generally facing toward the inner surface of the seat(s), the reinforcement layer being located proximate the inner surface of the seat(s), forming a basic seat(s) assembly. The inner surface of the seat(s) generally may form a curved plane, and the series of continuous unwelded coil mat system(s)/overlapping or adjacent coils may be arranged in overlapping or side-by-side rows to form a curved plane that is generally parallel to the curved plane of the inner surface of the seat(s). The amount by volume of the filler material, which may include carbon fiber with resin, polycarbonate, and other materials may be about the same on either side of the curved plane of the series of continuous unwelded coil mat system(s)/coils, such that the curved plane of the series of continuous unwelded coil mat system(s)/coils is located in approximately the middle of the reinforcement layer.

The continuous unwelded coil mat system(s)/overlapping or adjacent coils may have overlapping ranges. The continuous unwelded coil mat system(s)/coils may be comprised of metal, plastic or other material. The continuous unwelded coil mat system(s)/coils may be comprised of metal selected from the following list: carbon steel, alloy steel, stainless steels, brass, copper, titanium, and much more including tool steel. The continuous unwelded coil mat system(s)/coils may be comprised of polypropylene, Kevlar®, any plastic or graphene, or other materials. The continuous unwelded coil mat system(s)/coils may be comprised of plastic, or other material science.

A reinforced and impact attenuating seat(s) that includes a seat configured to receive the body of the automobile or racing vehicle driver in the seat, the seat comprising an outer surface and an inner surface; mesh or weave; filler material; the mesh or weave is entirely encased within the filler material to form a reinforcement layer, the reinforcement layer having a first surface and an opposing surface, the first surface of the reinforcement layer generally facing toward the inner surface of the seat(s), the reinforcement layer being located proximate the inner surface of the seat(s), forming a basic seat(s) assembly.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

In accordance with a first aspect of the present invention there is provided a seat assembly that includes a main body portion that includes a seat portion and a back portion extending upwardly from the seat portion. The main body portion includes an inner layer and an outer layer, and a middle layer is positioned between the inner and outer layers. The middle layer includes a plurality of rings that are not co-axial with one another. Preferably, each of the plurality of rings in the middle layer includes an outer circumferential surface, and the outer circumferential surface of adjacent rings are in contact with one another (e.g., to form a continuous upper and lower surface).

In a preferred embodiment, the middle layer comprises a filler material and includes an inner surface and an outer surface and the plurality of rings are encased in the filler material and disposed between the inner surface and the outer surface. In an embodiment, none of plurality of rings overlap one another. In an embodiment, the plurality of rings are connected. In an embodiment, the plurality of rings are not encased in a filler material. In another embodiment, some of the rings are encased in the filler material and others are not. In another embodiment, the rings are only partially encased in the filler material and the upper and lower surfaces of the rings are the upper and lower surfaces of the middle layer. In a preferred embodiment, a (first) portion of the plurality of rings are positioned in the seat portion and a (second) portion of the plurality of rings are positioned in the back portion. Preferably, the main body portion includes first and second side portions and a (third) portion of the plurality of rings are positioned in the first and second side portions. In another embodiment, the plurality of the rings are positioned in a continuous format of a continuous set including a seat portion, a back portion, and two side portions all in one continuous seat format.

In a preferred embodiment, the seat assembly may include a non-Newtonian layer positioned between the inner and outer layers and the non-Newtonian layer comprises a non-Newtonian fluid therein. The non-Newtonian layer may include at least a first bladder member that defines a bladder interior and the non-Newtonian fluid is disposed in the bladder interior. The bladder member may include a plurality of cells that each include the non-Newtonian fluid disposed therein. In a preferred embodiment, the middle layer includes at least a first bladder member that defines a bladder interior with a non-Newtonian fluid disposed in the bladder interior, and the plurality of rings are disposed in the non-Newtonian fluid. In a preferred embodiment the rings may be incorporated or suspended within the non-Newtonian fluid within and suspended within the honeycomb cells, or included within a single bladder with one cavity with the coils/rings suspended within the non-Newtonian fluid.

In accordance with a preferred embodiment of the present invention, a reinforced to strengthen the material science and energy attenuating impact mitigation seat(s) is provided comprising a seat(s) configured to receive the driver's entire seated body in the seat(s), the seat(s) comprising an outer surface and an inner surface; a series of continuous unwelded coil mat system(s)/overlapping or side-by-side coils; and filler material. The series of continuous unwelded coil mat system(s)/overlapping coils are entirely encased within the filler material to form a reinforcement layer, the reinforcement layer having a first surface and an opposing surface, the first surface of the reinforcement layer generally facing toward the inner surface of the seat(s), the reinforcement layer being located proximate the inner surface of the seat(s), forming a basic seat(s) assembly. Preferably, the inner surface of the seat(s) generally forms a curved plane, and wherein the series of continuous unwelded coil mat system(s) coils are arranged in overlapping or side-by-side rows to form a curved plane that is generally parallel to the curved plane of the inner surface of the seat(s). Preferably, the amount by volume of the filler material is about the same on either side of the curved plane of the series of continuous unwelded coil mat system(s)/coils, such that the curved plane of the series of continuous unwelded coil mat system(s)/coils is located in approximately the middle of the reinforcement layer. Preferably, the seat(s) comprises one or more adjustable memory foam or other materials used in pads affixed proximate the opposing surface of the reinforcement layer. Preferably, the seat(s) comprises one or more adjustable fit to size the seat and back portions of the seat, and may comprise the side portions or one continuous memory foam pad(s) comprised of two or more layers. Preferably, the filler material is selected from the list of, but not limited to: carbon fiber, fiberglass, nylon, polypropylene, polyethylene, linear low density polyethylene, polyamides, high density polyethylene, polyesters, polystyrene, polyvinyl chloride, and other additive materials metal and other non-metal materials including bonding materials such as resin. Preferably, the diameter of the continuous unwelded coil mat system(s)/overlapping or side-by-side or adjacent or next to each other coils range from about 0.25 inches to about 3 inches. Preferably, the continuous unwelded coil mat system(s)/coils are comprised of some kind of plastic including but not limited to Teflon, copper, bronze, titanium, metal, or other material science. Preferably, the continuous unwelded coil mat system(s)/connected coils are comprised of metal selected from the following list: carbon steel, alloy steel, stainless steels, tool steel, titanium, graphene, composites, and other materials including but not limited to: polypropylene, Kevlar®, or other material science not listed here. Preferably, the continuous unwelded coil mat system(s)/coils are comprised of micro tubes. Preferably, the outer surface of the seat(s) comprises one or more openings through which the continuous unwelded coil mat system(s)/overlapping coils may be visible. Preferably, the filler material is a bonding material.

In accordance with another preferred embodiment of the present invention, a reinforced and impact attenuating seat(s) is provided comprising a seat(s) configured to receive the body of the driver of the seat(s), the seat(s) comprising an outer surface and an inner surface; a middle surface(s) prospectively including a mesh or weave; and filler material. The mesh or weave is entirely encased within the filler material to form a reinforcement layer, the reinforcement layer having a first surface and an opposing surface, the first surface of the reinforcement layer generally facing toward the inner surface of the seat(s), the reinforcement layer being located proximate the inner surface of the seat(s), forming a basic seat(s) assembly. Preferably, the inner surface of the seat(s) generally forms a curved plane, and wherein the mesh is arranged to form a curved plane that is generally parallel to the curved plane of the inner surface of the seat(s). Preferably, the amount by volume of the filler material is about the same on either side of the curved plane of the mesh, such that the curved plane of the mesh is located in approximately the middle of the reinforcement layer(s). Preferably, the seat(s) further comprises one or more adjustable pentagonal or octagonal or shaped memory foam pads affixed proximate the opposing surface of the reinforcement layer. Preferably, the one or more adjustable pentagonal or octagonal memory foam pads are comprised of one or two or more layers. Preferably, the outer surface of the seat(s) comprises one or more openings through which the continuous unwelded coil mat system(s)/coils may be visible. Preferably, the filler material is a bonding material.

In accordance with another preferred embodiment of the present invention, a reinforced and impact attenuating seat(s) is provided comprising a seat(s) and reinforcement layer configured to receive the body of the driver of the seat(s), the seat(s) comprising an outer surface and an inner surface, the inner surface of the seat(s) generally forming a curved plane, to form a basic seat(s) assembly. In accordance with the invention, the foregoing advantages are believed to have been achieved by the inventive reinforced impact attenuating seat(s)s of the current invention. The seat(s)s of the current invention generally may include: an outer seat(s) having an inner wall surface and an outer wall surface, the seat(s) including a base seat, a back, a front, a headrest area, a lower edge surface, and two sides, the seat(s) being adapted to receive the body of the driver in the seat(s).

The reinforced seat(s) of the current invention, when compared with the prior art conventional safety seat(s)s, is theorized to have the advantages of: offering more impact protection and energy attenuation to general automotive and racing drivers against injuries caused by a wider range of encountered impact forces exerted upon the automobile and the auto seat(s) during the driving of the automotive vehicle; providing a seat(s), which is equal or lighter weight than the prior art and is more form fitting, stronger, potentially more comfortable for the driver in the seat(s), and the present invention is distinct from the prior art having inventive energy attenuating/impact mitigating/reinforcement geometries that provides a wider range of impact force attenuation and displacement.

As an example, the prior art seat(s) having only material science such as carbon fibers only in all, or a portion of the seat(s) or only in certain segments, or layer with other material science only such as fiberglass, nylon, etc.

Additionally, the prior art that is not aware or does not consider the use of energy attenuating methods designed in construct combined with material science to convert impact force to heat, or reinforcement attenuating inventive apparatuses as stated herein.

The inventive and previously unavailable impact mitigation/energy attenuation apparatuses employing, reduction, and displacement characteristics that reduces motion transfer thus improving the overall safety performances of safety seat(s)s in general.

Preferably, the reinforcement is housed in a seat(s) of a seat(s)(s), encompassing a wide variety of force attenuating reinforcement apparatuses that are articulated so that the displacement of impacts results in a force component outside the impact axis of the direct or indirect impact of the seat(s)(s). The impact force attenuating control device(s) can be incorporated into a wide variety of safety seat(s)(s) of a variety of sizes and configurations to produce impact reduction. The reinforcement "continuous unwelded coil mat system(s)/overlapping coil" attenuate the impact(s) highly non-linear system(s) derived from their tunable dynamic response, encompassing linear, and weakly nonlinear, and strongly nonlinear impact(s) regimes, for methods and apparatuses controlling the varying static and dynamic applied load(s), attenuates the propagation of highly nonlinear solitary waves of these impact waves, including the traveling pulse width, wave speed, including a number of separated pulses (singular or train of pulses), etc., are controlled by "continuous unwelded coil mat system(s)/side-by-side coil" reinforcement(s) modifying one or many of the impact parameters, such as the, static and dynamic force amplitude, the type and duration of the initial excitation (impact) applied to the continuous unwelded coil mat system(s)/coils reinforcement system(s), and/or the periodicity of the continuous unwelded coil mat system(s)/coil having the ability to control the wave properties in such continuous unwelded coil mat system(s)/overlapping coil as needed, including the collective vibrations of the methods and apparatuses reinforcement(s) particles for controlling the dynamic response of the reinforcement methods and apparatuses attenuating system(s); further including such as the re-formation of reflected solitary waves propagating back from the interface, which are sensitive to the "continuous unwelded coil mat system(s)/overlapping or adjacent or side-by-side coil" geometric configurations and material properties of the adjoining media; and an impact reinforcement attenuating apparatus having material composed of continuous unwelded coil mat system(s)/coil plastic material, wherein said layer of filler or bonding material comprises synthetic plastic material, and an impact reinforcement attenuating apparatus having material composed of continuous unwelded coil mat system(s)/side-by-side or adjacent connected coil plastic, wherein each hemisphere or strip is molecularly oriented in the same direction of the of the length of the seat(s) or strip, and an impact reinforcement attenuating apparatus having attenuating material composed of continuous unwelded coil mat system(s)/overlapping coil plastic material, wherein each strip is of a synthetic plastic material selected from the group consisting of Teflon, polypropylene, polyethylene, linear low density polyethylene, polyamides, high density polyethylene, polyesters, polystyrene, polyvinyl chloride, and more with their copolymers and mixtures thereof, and an impact reinforcement attenuating apparatus having material composed of continuous unwelded coil mat system(s) coil plastic material, wherein the width of each strip in the range of from about 0.005 to about 2.00 inches, and an impact reinforcement attenuating apparatus having material composed of continuous unwelded coil mat system(s)/coil plastic material, wherein the gauge/thickness of each strip is in the range of from about 0.01 to about 0.50 inches.

In accordance with another preferred embodiment of the present invention, an impact reinforcement attenuating apparatus is provided having material composed of continuous unwelded coil mat system(s)/connected coil plastic material or other natural or hybrid materials, wherein a layer of material comprises synthetic plastic material selected from the group consisting of linear low density polyethylene, ionomers, polyvinyl chloride, ethyl vinyl acetate, ethyl propyl copolymers, polyethylene copolymers, Teflon, low density polyethylene, their copolymers, vinyl copolymers and mixtures thereof linear low density polyethylene, ionomers, polyvinyl chloride, ethyl vinyl acetate, ethyl propyl copolymers, polyethylene copolymers, low density polyethylene, their copolymers, vinyl copolymers polyolefin, polypropylene, polystyrene, polyethylene, polyurethane, polyvinyl alcohol (water soluble), burlap, silk, carbon, Kevlar®, steel comprised of carbon steels, alloy steels, stainless steels, tool steels, or other natural or hybrid materials and mixtures thereof, and an impact reinforcement attenuating apparatus having material composed of continuous unwelded coil mat system(s)/connected coil plastic material, or other natural or hybrid materials, wherein the thickness of each laminate filler or bonding layer is in the range of from about 0.01 to 0.50 inches, and an impact reinforcement attenuating apparatus having material composed of continuous unwelded coil mat system(s)/coil plastic material or other natural or hybrid materials, wherein said layer of filler or bonding material comprises synthetic plastic material, and an impact reinforcement attenuating apparatus having material composed of continuous unwelded coil mat system(s)/overlapping coil plastic material or other natural or hybrid materials, wherein each strip is of a synthetic plastic material consisting of selected from the group consisting of polypropylene, polyethylene, linear low density polyethylene, polyamides, high density polyethylene, polyesters, polystyrene, polyvinyl chloride, their copolymers and mixtures thereof, and an impact reinforcement attenuating apparatus having material composed of coiled plastic material or other natural or hybrid materials, wherein the width of each strip in the range of between about 0.02 to about 1.00 inch, and an impact reinforcement attenuating apparatus having material composed of coiled plastic material, wherein the thickness of each strip is in the range of from about 0.01 to about 0.250 inches.

In accordance with another preferred embodiment of the present invention, an impact reinforcement attenuating apparatus is provided having material composed of coiled plastic material, wherein said layer of filler or bonding material including, but not limited to comprises carbon fiber, fiberglass, Kevlar, synthetic plastic material selected from the group consisting of linear low density polyethylene, ionomers, polyvinyl chloride, ethyl vinyl acetate, ethyl propyl copolymers, polyethylene copolymers, low density polyethylene, their copolymers, vinyl copolymers and mixtures thereof linear low density polyethylene, ionomers, polyvinyl chloride, ethyl vinyl acetate, ethyl propyl copolymers, polyethylene copolymers, low density polyethylene, their copolymers, vinyl copolymers polyolefin, polypropylene, polystyrene, polyethylene, polyurethane, polyvinyl alcohol (water soluble), burlap, silk, carbon, or other natural or hybrid materials and mixtures thereof, and an impact reinforcement attenuating apparatus having material composed of coils made out of plastic or stainless steel metals, metal alloys and other hybrid materials, and an impact reinforcement attenuating apparatus having material composed of coiled stainless steel, and an impact reinforcement attenuating apparatus having material composed of coiled carbon fibers, and an impact reinforcement attenuating apparatus having material composed of coiled interlocking graphene hoops, hooks, and rings, and an impact reinforcement attenuating apparatus having material composed of coiled plastic material, wherein the thickness of each filler or bonding layer is in the range of but not limited to from about 0.00005 to 0.250 inches.

In accordance with another preferred embodiment of the present invention, an impact reinforcement attenuating apparatus is provided having material composed of molded/stamped/printed/poured/individually produced rings made out of plastic or other materials, wherein said layer of filler or bonding material comprises carbon fiber, fiberglass and more, plus synthetic plastic material selected from the group consisting of linear low density polyethylene, ionomers, polyvinyl chloride, ethyl vinyl acetate, ethyl propyl copolymers, polyethylene copolymers, low density polyethylene, their copolymers, vinyl copolymers and mixtures thereof linear low density polyethylene, ionomers, polyvinyl chloride, ethyl vinyl acetate, ethyl propyl copolymers, polyethylene copolymers, low density polyethylene, their copolymers, vinyl copolymers polyolefin, polypropylene, polystyrene, polyethylene, polyurethane, polyvinyl alcohol (water soluble), burlap, silk, carbon, Kevlar® or other natural or hybrid materials and mixtures thereof, and an impact reinforcement attenuating apparatus having material composed of woven plastic material, wherein the thickness of each filler or bonding layer is in the range of from about 0.01 to 0.50 inches, and an impact reinforcement attenuating apparatus having material composed of woven plastic material, and an impact reinforcement attenuating apparatus having material composed of woven plastic material, wherein said layer of filler or bonding material comprises synthetic plastic material, and an impact reinforcement attenuating apparatus having material composed of woven plastic material, wherein each strip is of a synthetic plastic material consisting of selected from the group consisting of polypropylene, polyethylene, linear low density polyethylene, polyamides, high density polyethylene, polyesters, polystyrene, polyvinyl chloride, their copolymers and mixtures thereof, and an impact reinforcement attenuating apparatus having material composed of woven plastic material, wherein the width of each strip in the range of between about 0.02 to about 1.00 inch, and an impact reinforcement attenuating apparatus having material composed of woven plastic material, wherein the thickness of each strip is in the range of from about 0.01 to about 0.250 inches.

Preferably, the seat(s) comprises a coiled attenuating apparatus, wherein the seat(s) comprises a mesh attenuating apparatus, wherein the seat(s) comprises a woven attenuating apparatus, wherein the configuration of the continuous unwelded coil mat system(s)/connected coils attenuation apparatus contains coils is encased in plastic or plastics, wherein the configuration of the continuous unwelded coil mat system(s)/coils attenuation apparatus contains coils is encased in plastic or plastics in seat(s), and wherein the configuration of the continuous unwelded coil mat system(s)/overlapping coils attenuation apparatus overlapping percentage ranges from 1% to 100%, and contains features and advantages of the invention will be apparent from the following specification taken in conjunction with the following drawings.

As a further example, Kevlar and carbon fibers are composite structure types that are much stronger than the bulk filler or bonding material alone and are more economical than the stronger material alone. The seat(s)(s) seat(s) specifications can vary widely depending upon their intended use and applications to meet a wide variety of uses and the composite criteria(s). The following advantages are theorized for the continuous unwelded coil mat system(s)/connected coils attenuation apparatus in seat(s)(s) seat(s) composites and other transportable automotive and racing equipment and having a longer potential operating life than the prior art. 1) Normal, bulk filler or bonding resin shrinkage may be better tolerated, thus improving shrinkage and micro cracking control. 2) Additionally dynamic composite continuous unwelded coil mat system(s)/overlapping or connected coils attenuation apparatus structures impact stresses transfers are mitigated circuitously realizing significantly more potential of the materials instead of compounded linearly as in the prior arts use of generally inefficient woven filaments in costly safety ultra-high performance seat(s)s. 3) Deformation by impact is better tolerated. 4) Linear compression enhances inward binding to offset longitudinal buckling. 5) Linear tension tends to bind. 6) Addresses improvements in strain and loading rates. 7) More efficient manufacturing process and less difficulties. 8) Process avoids the wastes of subtractive cutting or fitting. 9) Simplified tooling saves labor and materials and general handling. 10) Annular modularity adapts to digitally controlled production. 11) Continuous unwelded coil mat system(s)/overlapping coils attenuation apparatus can inter-penetrate one another intact. 12) Design configurations and adjustment are more easily accommodated.

The inventive methods and apparatus attenuating rings, coils or continuous circles in the coil mat system may be more readily configured in thin-seat(s) reinforced structures such as automotive and racing seat(s)s and other automotive equipment as stated herein.

In other specified embodiment, the current invention encompasses any suitable filler or bonding plastic and or resin process or systems such as, but not limited to lay-up application, lamination(s) process, auto-clave process, or other methods of manufacture may benefit. Continuous unwelded coil mat system(s)/overlapping coils attenuation apparatus emplacements during extrusions of composite bulk filler or bonding is applicable both to manual labor as well as in automated systems.

In other specified embodiment, the current invention encompasses any suitable filler or bonding plastic and or resin process or systems such as but not limited to include the continuous unwelded coil mat system(s)/overlapping or connected coils energy attenuation apparatus system also including a layer of honeycomb non-Newtonian fluid.

As an example, the continuous unwelded coil mat system(s)/overlapping or connected coils attenuation apparatus system may be configured and placed in a wide variety of patterns and configuration such as pre-engineered overlapping patterns, as the filler or bonding and filling material is being applied such as casting or injection molding such as continuous spooled wires, filaments. Roving filaments such as (or many carbon derived filaments such as graphene) may be spooled into the desired patterns as needed as their configuration(s) and flexibility may allow simpler handling and manufacture processes. Note stiffer materials often implies greater strength and reduced elongation properties, which are generally more preferred. Note that, simplistic, hand assembly can be more readily obtained. Note: generally, manual hand assembly work more easily translates into robotic manufacturing development.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

BRIEF DESCRIPTION OF THE DRAWINGS

FIG. 2 is a cross-sectional view of the main body portion with the middle layer comprising rings encased in a filler material between the inner and outer layers;

FIG. 3 is a cross-sectional view of the main body portion with the middle layers comprising rings encased in a thicker filler material and positioned between the inner and outer layers;

Like numerals refer to like parts throughout the several views of the drawings.

DETAILED DESCRIPTION OF THE PREFERRED EMBODIMENTS

Figure 1:
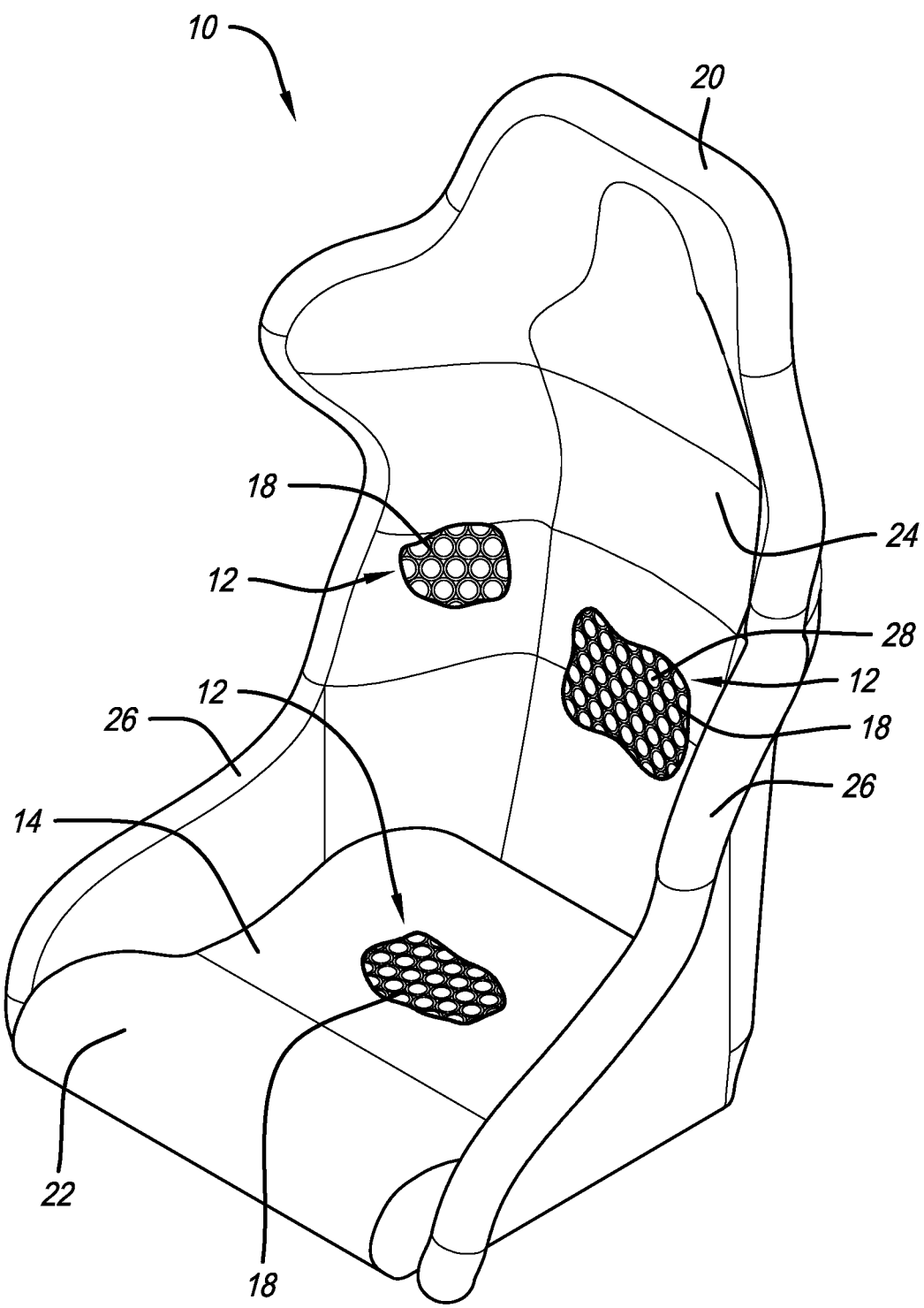
FIG. 1 is a perspective view of a seat assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It may be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, may control.

It may be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-7 show embodiments of a seat assembly 10 that includes an energy attenuating or middle layer 12 that is sandwiched or positioned between inner and outer layers 14 and 16. The middle layer 12 includes a plurality of rings 18 disposed therein. In a preferred embodiment, the seat assembly includes a main body portion 20 that includes a seat portion 22, a back portion 24 extending upwardly from the seat portion 22, and first and second side portions 26. It will be appreciated that the seat assembly or main body portion may take any shape known in the art and that the various seat, back and side portions may be shaped for different purposes, for different types of race cars, etc. and the shapes shown in the drawings are not limiting. It will be appreciated that the outer layer 16 is not necessarily the outermost layer, but is "outer" relative to the inner layer. FIGS. 2 and 3 show other layers 21 (e.g., further carbon fiber layers) positioned inside and outside of the inner and outer layers. Any number of layers (e.g., between 3-20 layers) are within the scope of the present invention.

FIG. 1 shows a few portions of the inner layer cut away to reveal the middle layer 12 and the rings 18 therein underneath. In a preferred embodiment, the rings 18 are disposed throughout the entire main body portion 20. In another embodiment, rings 18 may only be included in specific areas within the main body portion and not everywhere. In production, preferably, each of the layers are molded or otherwise produced separately and then stacked on one another.

FIG. 2 shows an embodiment where the middle layer 12 comprises a series or plurality of rings 18 that are encased in a filler material. In FIG. 2, the filler material 28 or layer is the same thickness as the rings 18. FIG. 3 shows an embodiment where the middle layer 12 comprises a series or plurality of rings 18 that are encased in a filler material 28 that is slightly thicker than FIG. 2 (and thicker than the rings). The middle layer 12 includes an inner surface 12a and an outer surface 12b. In the FIG. 2 embodiment, the inner and outer surfaces 18a and 18b of the rings comprise the inner and outer surface 12a and 12b. In the FIG. 3 embodiment, the inner and outer surfaces 12a and 12b surfaces created by the filler material 28 that encases the rings.

Figure 4A:
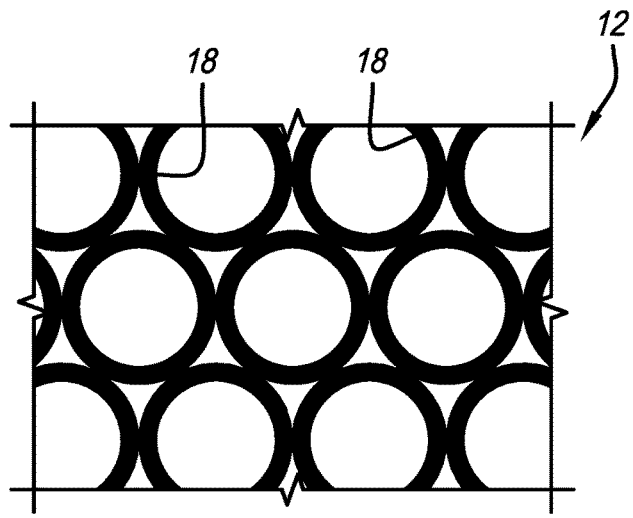
FIG. 4A is an example of the middle layer including rings not overlapping.
Figure 4B:
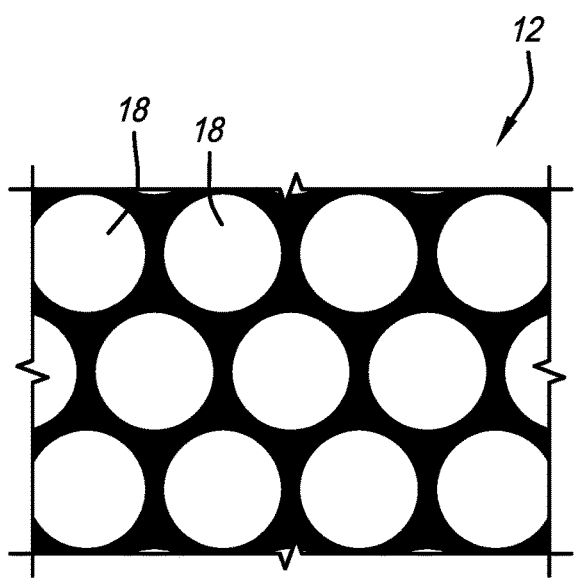
FIG. 4B is an example of the middle layer including rings not overlapping and connected to one another.
Figure 4C:
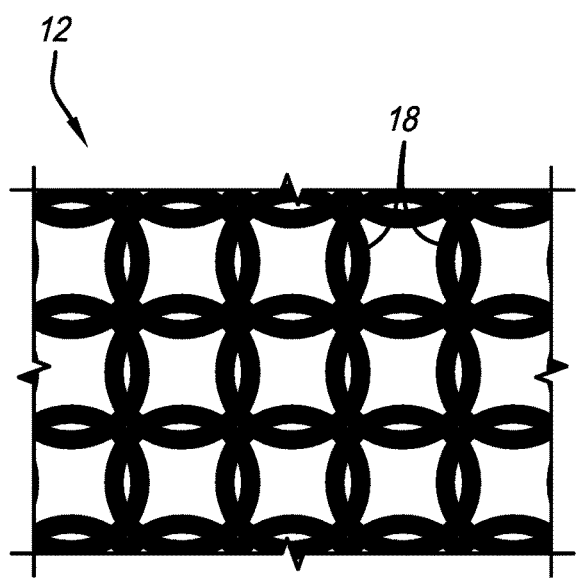
FIG. 4C is an example of the middle layer including rings that are overlapping.

In a preferred embodiment, the plurality of rings 18 are not co-axial with one another. The rings 18 may be co-planar with one another and placed side by side, as shown in FIGS. 2-4B. The rings 18 may overlap one another, as shown in FIG. 4C. Preferably, the rings 18 are not connected or welded to one another, but the outer circumferential surfaces of adjacent rings 18 are in contact with one another, as is shown in FIGS. 2-4A. In another embodiment, the rings 18 are not connected or welded to one another, and the outer circumferential surfaces of adjacent rings 18 may or may not be in contact with one another. FIG. 4B shows an embodiment, wherein the rings 18 are connected or welded to one another to create a mesh or continuous ring layer. In an embodiment where the rings are connected to one another, the ring layer may be created by pouring, stamping, welding or the like.

Figure 5:
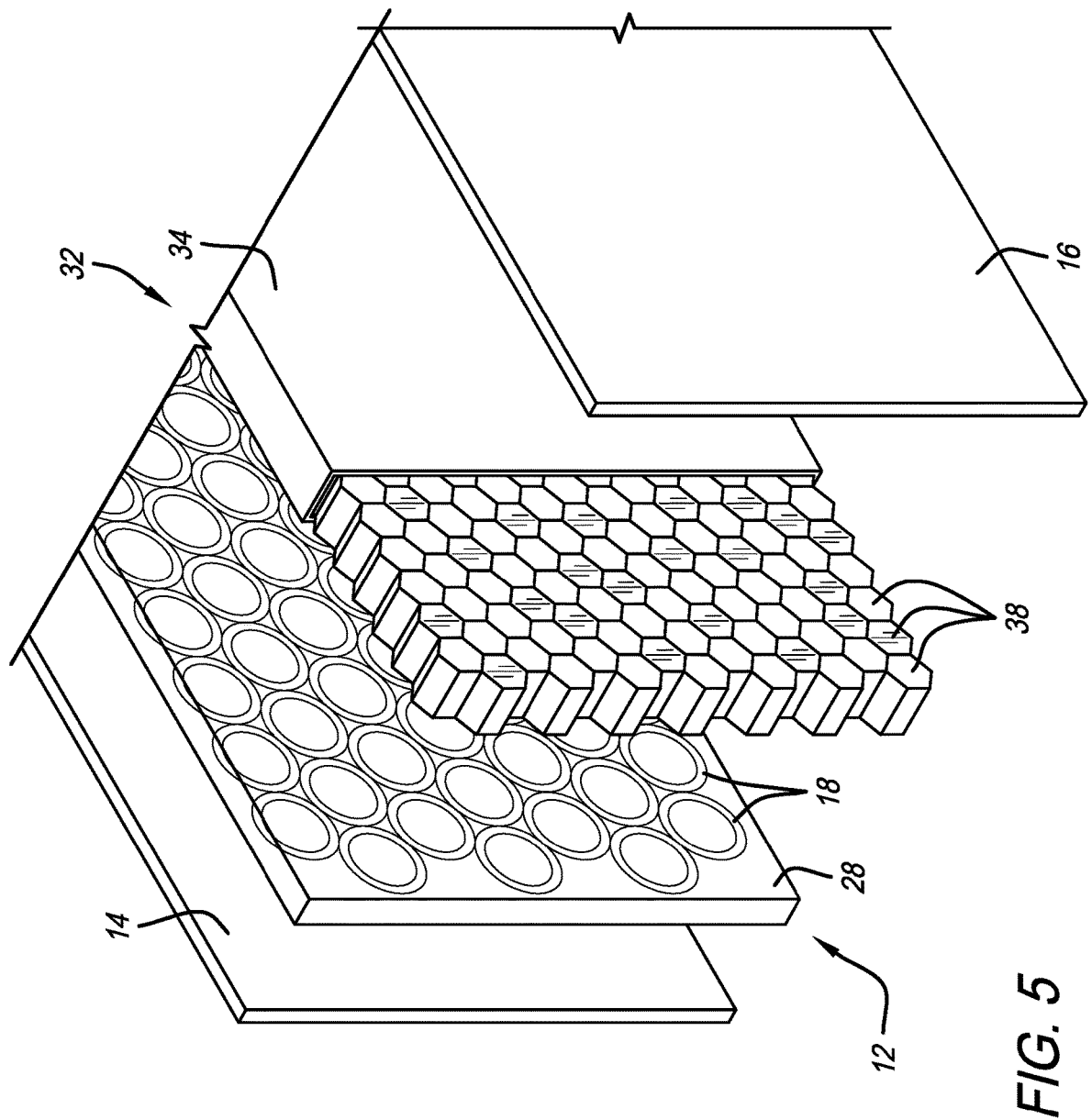
FIG. 5 is an exploded perspective view of a portion of the seat assembly including a non-Newtonian layer.
Figure 6:
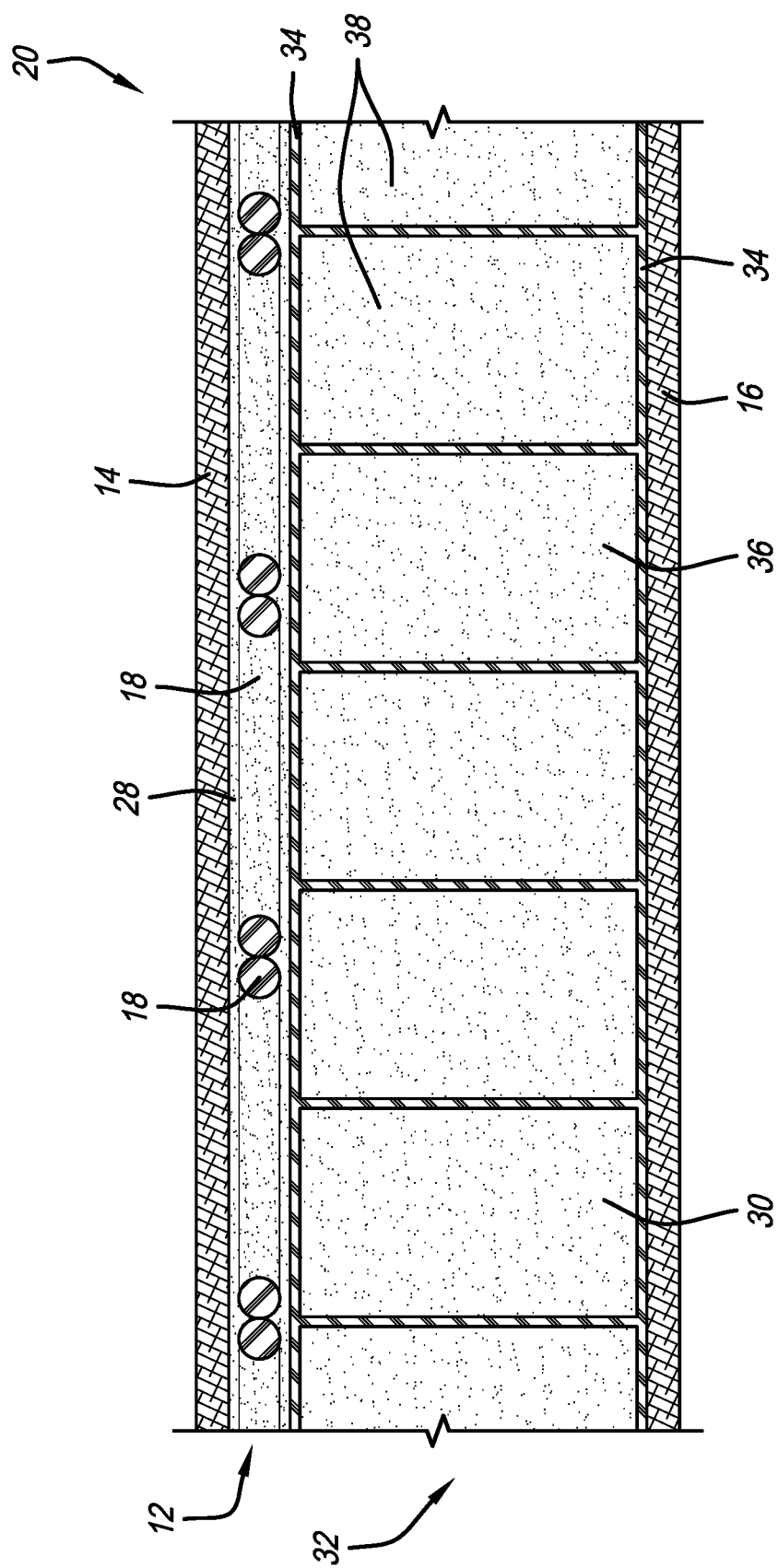
FIG. 6 is a cross-sectional view of a portion of the seat assembly including a non-Newtonian layer.
Figure 7:
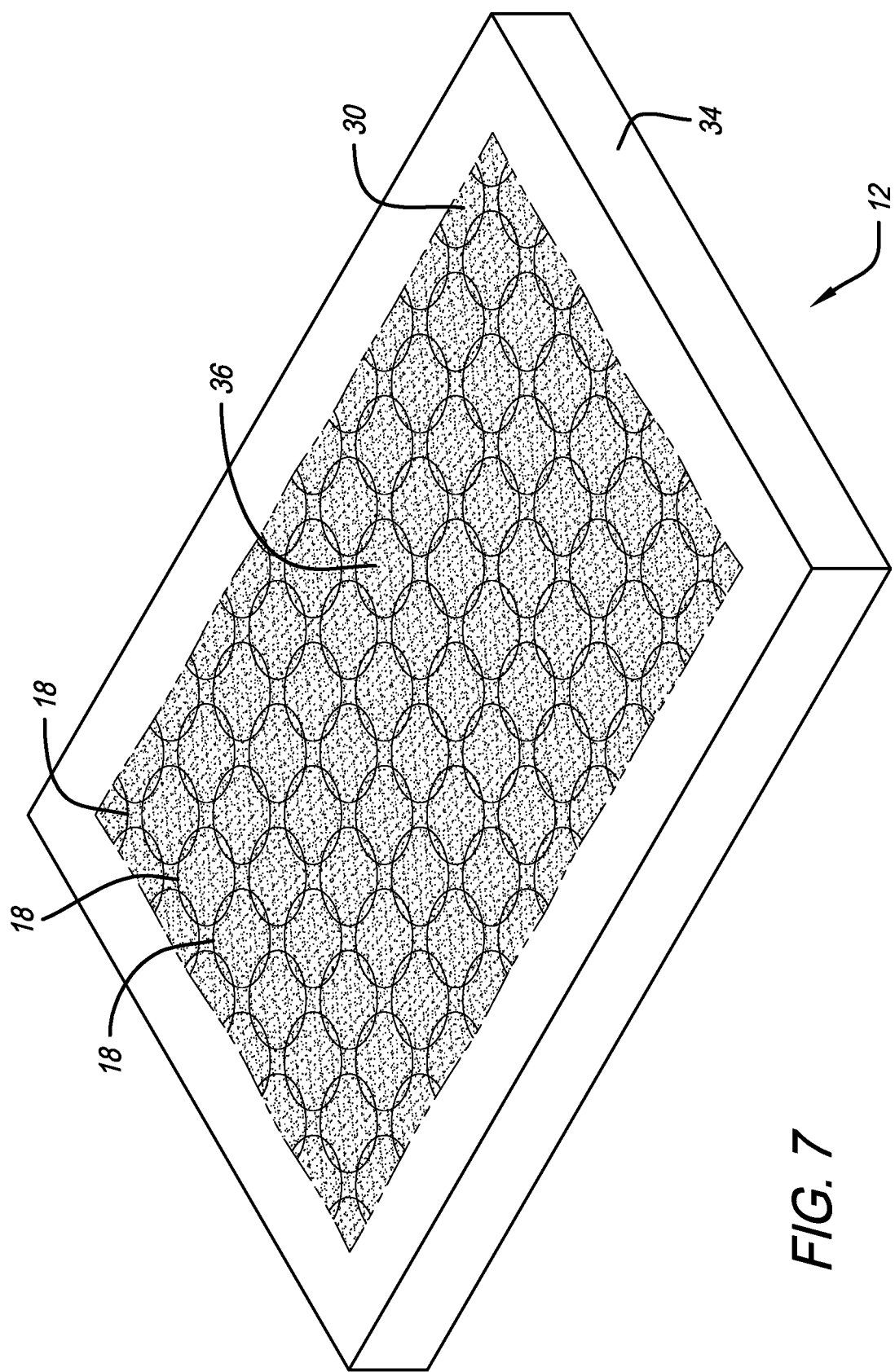
FIG. 7 is a perspective view of the middle layer including a bladder member with non-Newtonian fluid and rings therein and with a portion of the bladder member cutaway to see the bladder interior.

FIGS. 5-7 shows embodiments of the seat assembly 10 that include a non-Newtonian fluid 30. In FIGS. 5-6 show an embodiment that includes a non-Newtonian layer 32 that is positioned between the inner and outer layers 14 and 16. The non-Newtonian layer 32 includes the non-Newtonian fluid 30 therein. The non-Newtonian fluid may be encased or disposed within the bladder interior 36 of a bladder member 34. The bladder may be separate from the honeycomb cells (which may have their own cover), as shown in FIG. 5 or the bladder 34 may be unitary with and the top and bottom layer of the cells, as shown in FIG. 6). In a preferred embodiment, the non-Newtonian fluid 30 is disposed in a series of cells 38 that are disposed in the bladder member 34. The cells may have any shape, but preferably include a honeycomb shape. The non-Newtonian layer 32 can be disposed inside or outside of the middle layer 12.

FIG. 6 illustrates the layers containing the first inner layer of carbon fiber 14 or other material science, followed by the middle layer 12 or continuous unwelded coil or ring mat system(s)/overlapping coils attenuation apparatus, followed by a prospective layer of honeycomb cells 36 with non-Newtonian fluid layer 32, followed by the finishing or outer layer 16 of carbon fiber, etc.

As shown in FIG. 7, in a preferred embodiment, the middle layer 12 includes the non-Newtonian fluid therein. The middle layer 12 includes at least the bladder member 34 with the non-Newtonian fluid 30 disposed in the bladder interior 36, and the plurality of rings 18 are disposed in the non-Newtonian fluid 30.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art may recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and/or patent applications and other references are articles noted above or herein, including any that may be listed in accompanying filing papers, charts or figures are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A seat assembly comprising:
   a main body portion that includes a seat portion and a back portion extending upwardly from the seat portion, wherein the main body portion includes an inner layer and an outer layer, wherein a middle layer is positioned between the inner and outer layers, wherein the middle layer includes a plurality of rings that are not co-axial with one another, wherein the middle layer comprises a filler material and includes an inner surface and an outer surface, and wherein the plurality of rings are encased in the filler material and disposed between the inner surface and the outer surface.

2. The seat assembly of claim 1 wherein each of the plurality of rings in the middle layer includes an outer circumferential surface, and wherein the outer circumferential surfaces of adjacent rings are in contact with one another.

3. The seat assembly of claim 1 wherein none of the plurality of rings overlap one another.

4. The seat assembly of claim 1 wherein a portion of the plurality of rings are positioned in the seat portion and a portion of the plurality of rings are positioned in the back portion.

5. The seat assembly of claim 4 wherein the main body portion includes first and second side portions, and wherein a portion of the plurality of rings are positioned in the first and second side portions.

6. The seat assembly of claim 1 further comprising a non-Newtonian layer positioned between the inner and outer layers, wherein the non-Newtonian layer comprises a non-Newtonian fluid therein.

7. A seat assembly comprising:
a main body portion that includes a seat portion and a back portion extending upwardly from the seat portion, wherein the main body portion includes an inner layer and an outer layer, wherein a middle layer is positioned between the inner and outer layers, wherein the middle layer includes a plurality of rings that are not co-axial with one another, a non-Newtonian layer positioned between the inner and outer layers, wherein the non-Newtonian layer comprises a non-Newtonian fluid therein, wherein the non-Newtonian layer includes at least a first bladder member that defines a bladder interior, wherein the non-Newtonian fluid is disposed in the bladder interior.

8. The seat assembly of claim 7 wherein the bladder member includes a plurality of cells that each include the non-Newtonian fluid disposed therein.

9. The seat assembly of claim 1 wherein the middle layer includes at least a first bladder member that defines a bladder interior with a non-Newtonian fluid disposed in the bladder interior, wherein the plurality of rings are disposed in the non-Newtonian fluid.

10. The seat assembly of claim 1 wherein the plurality of rings are each made of plastic.

11. The seat assembly of claim 10 wherein the inner and outer layers comprise carbon fiber.

12. A seat assembly comprising:
a main body portion that includes a seat portion and a back portion extending upwardly from the seat portion, wherein the main body portion includes an inner layer and an outer layer, wherein a middle layer is positioned between the inner and outer layers, wherein the middle layer comprises a filler material and includes an inner surface and an outer surface, wherein a plurality of rings are encased in the filler material and disposed between the inner surface and the outer surface, wherein each of the plurality of rings in the middle layer includes an outer circumferential surface, wherein the outer circumferential surface of adjacent rings are in contact with one another, wherein a portion of the plurality of rings are positioned in the seat portion and a portion of the plurality of rings are positioned in the back portion.

13. The seat assembly of claim 12 further comprising a non-Newtonian layer positioned between the inner and outer layers, wherein the non-Newtonian layer includes at least a first bladder member that defines a bladder interior, wherein a non-Newtonian fluid is disposed in the bladder interior.

14. The seat assembly of claim 13 wherein the bladder member includes a plurality of cells that each include the non-Newtonian fluid disposed therein.

* * * * *